(12) United States Patent
Bauer et al.

(10) Patent No.: US 8,167,491 B2
(45) Date of Patent: May 1, 2012

(54) HYDROSTATIC MOUNTING

(75) Inventors: Wolfgang Bauer, Riegelsberg (DE); Thomas Gietl, Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 277 days.

(21) Appl. No.: 12/559,882

(22) Filed: Sep. 15, 2009

(65) Prior Publication Data

US 2010/0067836 A1 Mar. 18, 2010

(30) Foreign Application Priority Data

Sep. 16, 2008 (DE) .................. 10 2008 047 299

(51) Int. Cl.
*F16C 32/06* (2006.01)
*F16C 33/10* (2006.01)

(52) U.S. Cl. .............................. 384/12; 384/13; 384/15

(58) Field of Classification Search .......... 384/7, 12–14, 384/15, 45, 38, 100, 129–130
See application file for complete search history.

(56) References Cited

U.S. PATENT DOCUMENTS

| | | | | |
|---|---|---|---|---|
| 3,472,565 A | * | 10/1969 | Arneson | 384/113 |
| 3,899,222 A | * | 8/1975 | Mendelevsky et al. | 384/12 |
| 4,606,587 A | * | 8/1986 | Thompson | 384/12 |
| 4,978,233 A | * | 12/1990 | Stotzel et al. | 384/12 |
| 5,397,184 A | * | 3/1995 | Murai | 384/110 |
| 5,484,208 A | * | 1/1996 | Kane et al. | 384/12 |
| 5,971,614 A | * | 10/1999 | Kane et al. | 384/12 |
| 6,012,845 A | * | 1/2000 | Lyon | 384/12 |
| 2004/0042689 A1 | * | 3/2004 | Wasson et al. | 384/12 |

FOREIGN PATENT DOCUMENTS

| | | | |
|---|---|---|---|
| DE | 202007008446 | * | 10/2007 |
| JP | 11155398 A | * | 6/1999 |
| SU | 1132096 A | * | 12/1984 |

* cited by examiner

*Primary Examiner* — Marcus Charles
(74) *Attorney, Agent, or Firm* — Lucas & Mercanti, LLP; Klaus P. Stoffel

(57) ABSTRACT

A hydrostatic mounting of longitudinally displaceably arranged machine parts, which have pressure pockets for hydraulic fluid for building up a hydrostatic pressure between two machine parts, gaps connected to the pressure pockets and delimited by gap faces of the two machine parts, a drainage for the reception of hydraulic fluid flowing out from the gaps, and a seal, arranged effectively between the machine parts and surrounding the gaps, sealing against the escape of hydraulic fluid. An environment-side portion of the seal is at the same time a portion of the drainage creating a double-acting portion. The double-acting portion of the seal is formed from a material permeable to the hydraulic fluid.

5 Claims, 2 Drawing Sheets

HYDROSTATIC MOUNTING

This application claims the priority of DE 10 2008 047 299.9, filed Sep. 16, 2008, the priority of both applications is hereby claimed and both applications are incorporated by reference herein.

BACKGROUND OF THE INVENTION

The present invention relates to a hydrostatic mounting of longitudinally displaceably arranged machine parts, in particular a hydrostatic profile rail guide, in which a guide carriage is mounted hydrostatically on a guide rail.

For example, a hydrostatic profile rail guide has become known from WO2004/020852 A1, and in this a guide rail designed with an approximately T-shaped cross-section is surrounded by the guide carriage. The guide carriage has a back and legs located on both sides of the guide rail and adjoining the back in one piece, so that the guide carriage has an approximately U-shaped cross-sectional profile. The free ends of each leg are provided with screw-on flanges which spring toward one another so that the T-shaped guide rail is surrounded.

In this known hydrostatic profile rail guide, pressure pockets for building up a hydrostatic pressure between the guide rail and the guide carriage are provided in a known way on the guide carriage. Hydraulic fluid is pumped into the pressure pockets via an external pump, so that a pressure cushion is built up between the guide carriage and the guide rail. The hydraulic fluid flows out via gaps which are connected hydraulically to the pressure pockets. The gaps are delimited by gap faces which are formed on the guide carriage and on the guide rail.

Furthermore, this known hydrostatic profile rail guide is provided with drainage in order to receive hydraulic fluid which emerges from the gaps. The drainage is connected to a return duct or a reservoir, so that the hydraulic fluid can be supplied to the pump again and pumped anew into the pressure pockets of the hydrostatic profile rail guides.

Furthermore, a seal is provided, which ensures that this known hydrostatic profile rail guide is oil-tight. This seal is arranged effectively between the guide carriage and the guide rail. the seal has side portions and head portions, in each case at least one of the side portions of the seal which extend along the guide rail being arranged between each leg of the guide carriage and of the guide rail. In each case at least one of the head portions of the seal is arranged transversely to the guide rail on the two head sides of the guide carriage. This seal ensures that, even when the pump is switched off and the hydrostatic profile rail guide is at a standstill, no oil escapes in an undesirable way.

The arrangement of the pressure pockets, of the drainage and of the continuous seal requires considerable construction space which, for a given size of a machine part to be supported, is at the expense of the dimensioning of the pressure pockets. In specific applications, a pressure pocket of larger design is desirable, but cannot be implemented technically, because the limited construction space is taken up by the drainage and the seal. This problem applies particularly to hydrostatic profile rail guides which lie in the standard construction space of rolling profile rail guides according to DIN 645-1: there is often the wish to replace rolling profile rail guides by hydrostatic profile rail guides.

SUMMARY OF THE INVENTION

The object of the present invention is to specify a hydrostatic mounting which, in a simple way, allows an improved utilization of the available construction space.

This object is achieved, according to the invention, by means of the hydrostatic profile rail guide described subsequently herein. Since an environment-side portion of the seal is at the same time a portion of the drainage, and since this double-acting portion is formed from a material permeable to the hydraulic fluid, a considerable construction space for the drainage and the seal can be saved, so that an enlarged construction space for forming the pressure pockets is available.

The invention is implemented technically in a simple way in that the drainage duct is exposed to a low-pressure in a known way, so that hydraulic fluid is sucked in. If, then, hydraulic fluid flows out of the gaps surrounding the pressure pockets, the hydraulic fluid enters the drainage and is sucked away from there, for example into a reservoir, or is transferred to an external line and is supplied from there to an external pump again. The fact that the double-acting portion is formed from a material permeable to hydraulic fluid makes it possible in an inventive way for the hydraulic fluid to flow through the seal into the drainage.

The hydraulic fluid flowing out of the gaps is first captured in that portion of the seal which is formed from the permeable material. The fact that this portion of the seal can at the same time be exposed to a low pressure thus makes it possible to suck away the hydraulic fluid and prevents an undesirable escape of hydraulic fluid into the environment.

For example, this double-acting portion may be formed from a material which is pierced by a multiplicity of pores, as may be the case, for example, in a foamed material. The pores then have the ability to absorb hydraulic fluid, although the nature of the pores is such that, even when just a slight low pressure is applied, the hydraulic fluid can be sucked away from the pores.

In a preferred development according to the invention, one machine part is provided with a drainage duct for hydraulic fluid, which is designed, in particular, as a drainage groove and to which the double-acting portion of the seal is connected. The drainage duct, often provided in any case, can therefore at the same time be designed as a receptacle for the seal.

The seal may preferably be formed from an absorbent material, in which case, when the drainage is acted upon with a low pressure, hydraulic fluid is sucked out of the double-acting portion of the seal. The absorbent nature of this seal also makes it possible that no hydraulic fluid is undesirably discharged into the environment when the hydrostatic pressure is switched off.

The invention is suitable particularly for hydrostatic profile rail guides in which a guide carriage is arranged longitudinally displaceably on a hydrostatic mounting. One machine part is then formed by the guide carriage, the other machine part being formed by the guide rail. The guide carriage is of U-shaped design in a known way and is provided with a back and two legs, with which the guide rail can be partially surrounded.

In a guide carriage designed according to the invention, the seal is preferably arranged effectively between the guide carriage and the guide rail, the seal having a plurality of portions: side portions and head portions, in each case at least one of the side portions which extend along the guide rail being provided between each leg and the guide rail, in each case at least one of the head portions being arranged on both head sides of the guide carriage, the guide rail being partially surrounded, and at least one of the head portions of the seal being at the same time the drainage portion.

BRIEF DESCRIPTION OF THE DRAWINGS

The invention is explained in more detail below by means of an exemplary embodiment depicted in a total of four figures, in which.

DETAILED DESCRIPTION OF THE INVENTION

Figure 1:
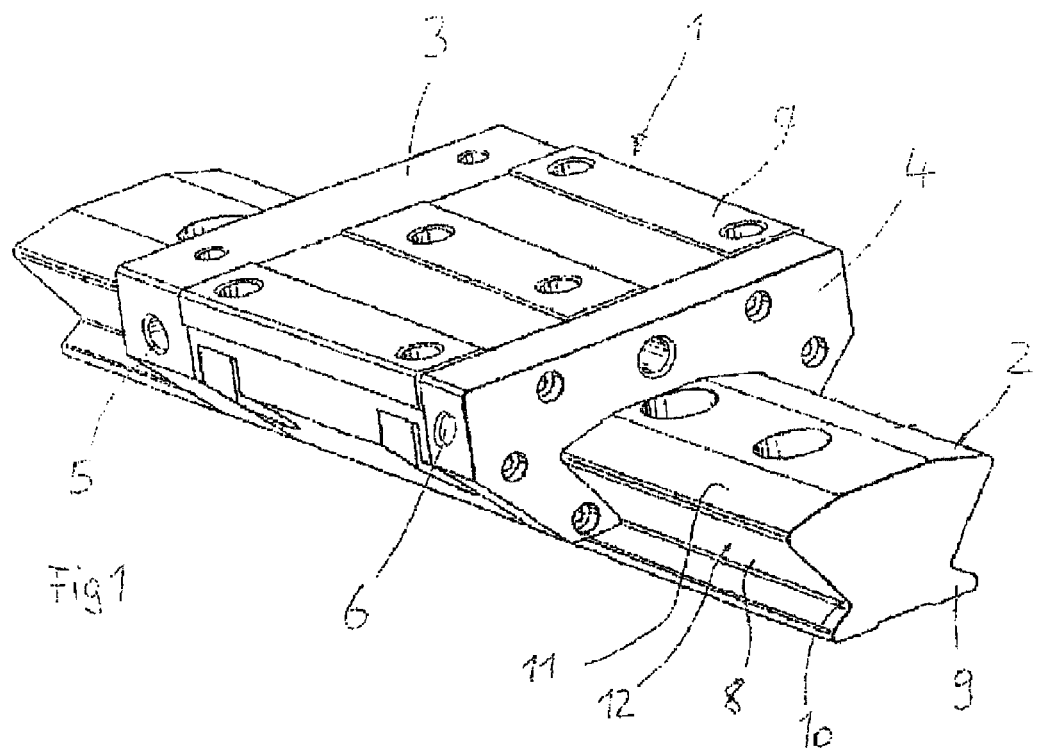
FIG. 1 shows a hydrostatic profile rail guide according to the invention in a perspective illustration.

FIG. 1 shows a perspective illustration of a hydrostatic profile rail guide according to the invention. A guide carriage 1 is mounted hydrostatically on a guide rail 2. The guide carriage 1 is provided on each of its two end faces with a head piece 3, 4, the head piece 3 being provided with a pressure connection 5 and the head piece 4 with a suction connection 6 for hydraulic fluid. The hydraulic fluid can be pumped via a pump, not depicted here, by way of the pressure connection 5 into the head piece 3 and from there via flow-regulating valves, likewise not depicted, into a carrying body 7 of the guide carriage 1. The hydraulic fluid is sucked away from the guide carriage 1 via the suction connection 6 and supplied anew to the pump, not depicted here.

The guide rail 2 has an approximately anvil-shaped rail head 8 and a rail foot 9, a contracted foot portion 10 being formed between the rail foot 9 and the rail head 8. The rail head 8 is provided on its two longitudinal sides in each case with 2 bearing faces 11, 12 which are arranged at an acute angle to one another and which extend along the longitudinal axis of the guide rail 2.

Figure 2:
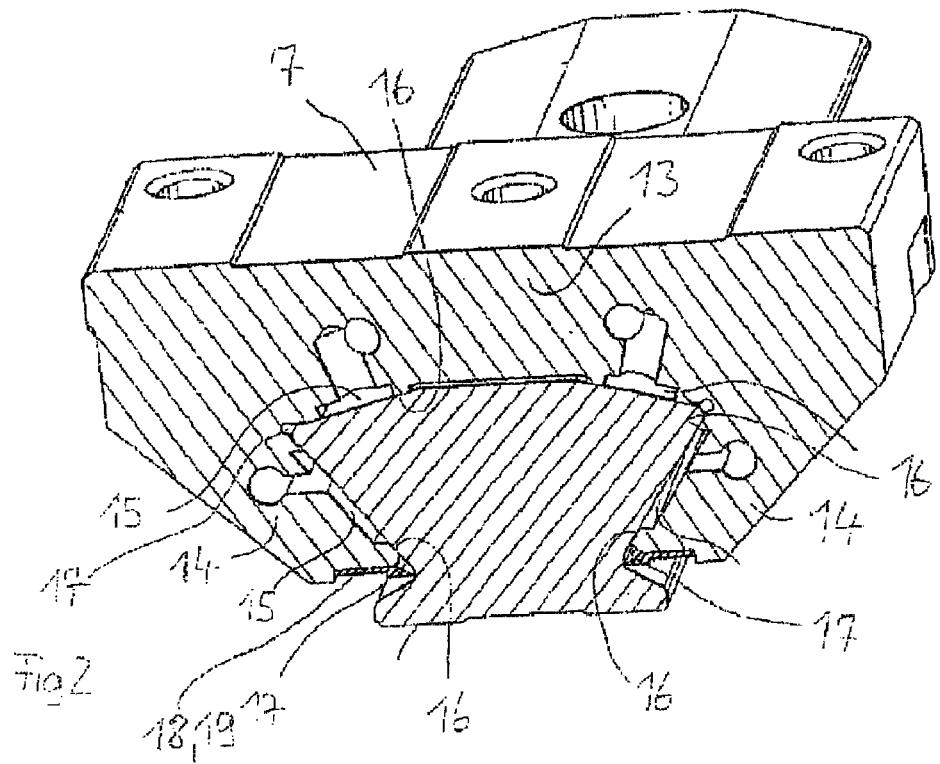
FIG. 2 shows a cross section through the hydrostatic profile rail guide from FIG. 1.

It can be gathered from FIG. 2 that the carrying body 7 has a back 13 and two legs 14 arranged parallel to and at a distance from one another, the carrying body 7 partially surrounding with its two legs 14 the guide rail 2. The carrying body 7 is provided, on its inner faces lying opposite the bearing faces 11, 12 of the guide rail 2, in each case with a pressure pocket 15 which extends along the carrying body 7. Gaps 16 are connected hydraulically to these pressure pockets 15. A hydrostatic pressure is built up via the pressure pockets 15 between the guide carriage 1 and the guide rail 2. The hydraulic fluid which is put under pressure in this way flows off via the gaps 16, along with a pressure drop, and finally, approximately pressureless, leaves the gaps 16. The hydraulic fluid, after emerging from the gaps 16, finally enters a drainage 17, so that all the pressure pockets 15 are connected to the drainage 17. The hydraulic fluid is sucked away via the drainage 17 into the head piece 4 and from there via the suction connection 6 out of the guide carriage 1.

In order to ensure that the hydraulic fluid can circulate in a closed circuit, the hydrostatic profile rail guide according to the invention is provided with a seal 18. This seal 18 is of continuous form, in that the seal 18 completely surrounds the drainage 17. The term "surround" is understood here to mean that the hydraulic fluid can leave the drainage solely via the paths provided and therefore does not leak out of the hydrostatic profile rail guide in an undesirable way.

The seal 18 according to the invention is composed of side seals 19 and head seals 20 which in each case form a circumferential portion of the seal 18. However, according to the invention, a circumferential portion of the seal is also understood to mean a circumferential part of the head seal, so that, in variants according to the invention, each head seal may be formed from a plurality of portions arranged circumferentially in succession.

It may be gathered particularly from FIG. 2 that the guide rail 2 is provided in the foot portion 10 in each case with one of the side seals 19 on both longitudinal sides of the guide rail 2.

In the exemplary embodiment, the side seal 19 is formed by a lip seal which bears sealingly against the foot portion 10 of the guide rail 2. These side seals 19 extend over the entire travel of the guide carriage 1.

Figure 3:
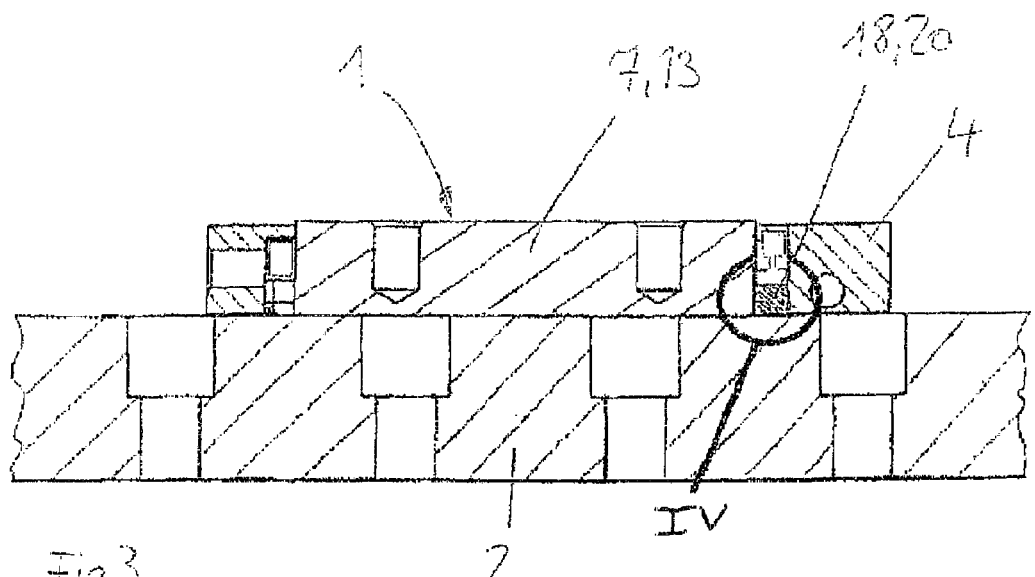
FIG. 3 shows a partial longitudinal section through the hydrostatic profile rail guide.

The two head seals 20 are arranged in the guide carriage 1, specifically in each case in one of the two head pieces 3, 4. FIG. 3 shows a partial cross section through the profile rail guide with the head seal 20 which is shown in section and which is depicted in an enlarged illustration in FIG. 4.

Figure 4:
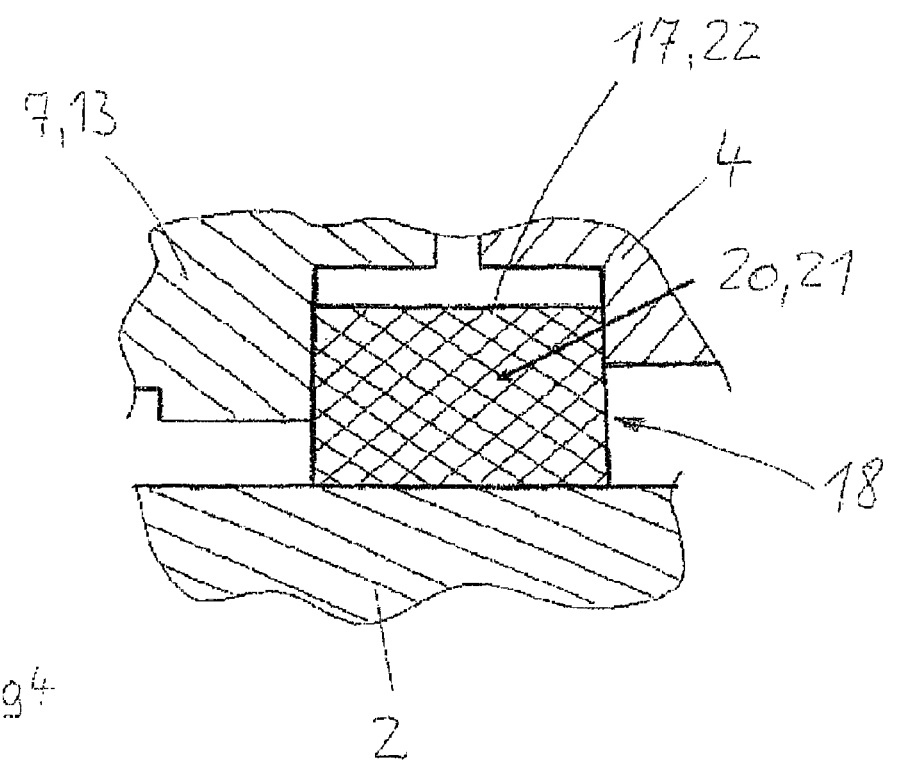
FIG. 4 shows an enlargement from FIG. 3 in the form of detail IV.

FIG. 4 shows clearly a cross section through the head seal 20. The head seal 20 according to the invention is formed here from a porous, absorbent material. Hydraulic fluid can be absorbed in the pores, not depicted in any more detail here, and be prevented from flowing out into the environment in an undesirable way. The head seal 20 here forms a circumferential portion of the seal 18 which is at the same time a portion of the drainage 17; this portion is designated below as a double-acting portion 21. It can be gathered from the figure that the head seal 20 is arranged in a drainage groove 22 of the drainage 17 and with its side facing the guide rail 2 bears over its area against the guide rail 2.

In variants according to the invention, this bearing side of the head seal may have a liquid-tight coating and be pressed, liquid-tight, onto the guide rail 2, so that no hydraulic fluid, with the exception of a leakage provided, if appropriate, can flow through between the guide rail 2 and the head seal 20.

Hydraulic fluid passes into the porous head seal 20 and may settle in the pores. The drainage groove 22 can be acted upon with a low pressure. Under the action of the low pressure, the hydraulic fluid is sucked away out of the porous head seal 20, the pores releasing the hydraulic fluid again. This means that the double-acting portion 21 assumes two functions: on the one hand, it prevents the undesirable escape of hydraulic fluid from the profile rail guide; on the other hand, it is part of the drainage 17 for sucking hydraulic fluid out of the guide carriage 1 and supplying it anew to the external pump. Integrating the seal into the drainage affords the advantage that more space is available for enlarging the pressure pockets 15.

In variants according to the invention, the seal 18 may be formed continuously from the porous, absorbent material. In this case, further construction space is available for enlarging the pressure pockets.

LIST OF REFERENCE NUMERALS

1 Guide carriage
2 Guide rail
3 Head piece
4 Head piece
5 Pressure connection
6 Suction connection
7 Carrying body
8 Rail head
9 Rail foot
10 Foot portion
11 Bearing face
12 Bearing face 13 Back
14 Leg
15 Pressure pocket
16 Gap
17 Drainage
18 Seal
19 Side seal
20 Head seals
21 Double-acting portion
22 Drainage groove

The invention claimed is:

1. A hydrostatic mounting of longitudinally displaceably arranged machine parts, comprising:
    pressure pockets for hydraulic fluid for building up a hydrostatic pressure between the machine parts;
    gaps connected to the pressure pockets and delimited by gap faces of the machine parts;
    a drainage receiving hydraulic fluid flowing out from the gaps; and
    a seal, arranged effectively between the machine parts and surrounding the gaps, sealing against escape of the hydraulic fluid, and an environment-side portion of the seal has a portion for drainage formed from a material permeable to the hydraulic fluid.

2. The hydrostatic mounting of claim 1, wherein one of the machine parts has a drainage groove for the hydraulic fluid, to which the seal is connected.

3. The hydrostatic mounting of claim 2, wherein the seal is formed from an absorbent material, and the hydraulic fluid is sucked out of the seal by low pressure.

4. A guide carriage of a hydrostatic profile rail guide with the hydrostatic mounting of claim 1, comprising: one of the machine parts supported hydrostatically on a guide rail and having a U-shaped cross-section with a back and two legs which partially surround the hydrostatic profile rail guide.

5. The guide carriage of claim 4, wherein the seal is arranged between the guide carriage and the guide rail, and the seal has a plurality of portions formed by side portions and head portions, and at least one of the side portions, which extends along the guide rail, is provided between each of the legs and the guide rail, and at least one of the head portions, which is arranged transversely to the guide rail being arranged on both head sides of the guide carriage and partially surrounding the guide rail, and at least one of the head portions of the seal being the portion for drainage.

* * * * *